(No Model.)
E. BOCKMÜHL & W. KARTHAUS.
DRIVING BELT.
No. 372,297. Patented Nov. 1, 1887.
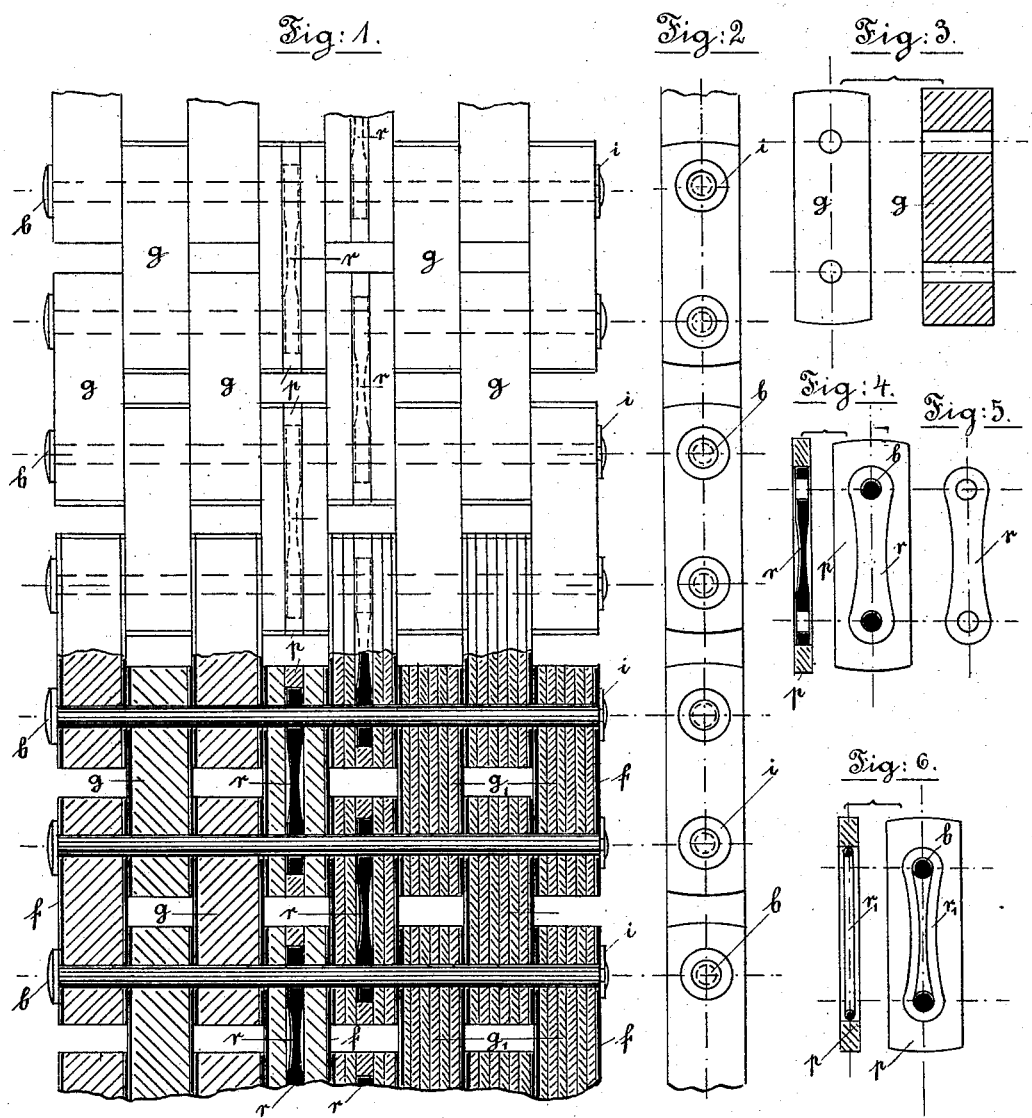

UNITED STATES PATENT OFFICE.

ERNST BOCKMÜHL AND WILHELM KARTHAUS, OF BARMEN, RITTERSHAUSEN, PRUSSIA, GERMANY.

DRIVING-BELT.

SPECIFICATION forming part of Letters Patent No. 372,297, dated November 1, 1887.

Application filed February 21, 1887. Serial No. 228,284. (No model.)

*To all whom it may concern:*

Be it known that we, ERNST BOCKMÜHL and WILHELM KARTHAUS, subjects of the German Emperor, residing at Barmen, Rittershausen, Rhenish Prussia, Germany, have invented a new and useful Improvement in Driving-Belts, of which the following is a specification.

This invention relates to machine-belting, and to such as is composed of single links arranged in rows and connected together to form a chain or belt by spindles passing alternately through the links of contiguous rows.

The improvements consist in an improved link to be used in said belting, either alone or in combination with links of paper, leather, or other material, as heretofore used.

The improvements further lie in the method of arranging said improved links in combination with ordinary links. The improved link is designed and is arranged in the belting so as to receive and bear the whole or greater part of the strain on said belting in a substantially direct line, so that the ordinary links may be made of material of less strength than would be necessary in belting without strengthened links, such as the improved links herein described.

Referring to the accompanying drawings, Figure 1 illustrates a portion of a driving-belt fitted with the improved links and others, partly in section. Fig. 2 is a side view thereof. Fig. 3 is a side view and section of a simple or ordinary link of which the belt may be mainly composed; Fig. 4, a section and side view of the improved or strengthened link, of which one, two, or more (according to the breadth of the belt) are used in each row of links; Fig. 5, the iron or steel plate or core giving the strength to the said link; Fig. 6, a section and side view of a modified form of such strengthened link.

The links shown in Fig. 3 are composed of compressed paper or papier-maché, the strength of which need not be considerable. Their surface should be sufficiently rough to insure biting on the pulleys. Instead of forming the link of one solid mass of paper, it may be composed of several layers, as shown on the right of Fig. 1, connected together by glue or suitable cement or adhesive material. Such a cement or material may be composed of buckwheat-flour boiled in water and mixed with colophony.

The improved strengthened links are composed of an interior link of steel or iron, $r\ r'$, which may be either in the form of a plate, as $r$, with the ends punched to receive the spindles $b$, or may be a link, such as $r'$, passing around the two spindles $b$. This steel or iron core is incased in a hollow paper block, to which the plates composing the side surfaces of the link are firmly attached on either side, thus entirely inclosing said metal core and offering a surface of paper to pulleys and to the neighboring links. Each of the links is provided at the sides with a smooth surface, $f$, to avoid, as much as possible, friction between the links, these surfaces being further coated with graphite.

The belt is formed of the links $g$ or $g'$ and the strengthened links in the manner shown in Fig. 1, one or more of the strengthened links being inserted into each row, according to the breadth of the belt. Thus for narrow belts one of said links will be sufficient in each row, it being placed, preferably, at or near the center of said row, and contiguous to the respective strengthened link in the next row; that in the third row will lie contiguous to that in the second and aligned with that in the first, the strengthened link in the fourth row being aligned with that in the second. For wider belts two or more such series of contiguously-arranged strengthened links should be arranged at suitable intervals across the belt.

We are aware that links of steel or iron have been inserted as links in such belting as is referred to in this invention. We do not therefore claim the use of a strengthening-link, broadly; but

We claim—

1. In link belting, a link composed of an interior metal plate or link, $r$ or $r'$, punched or shaped to lie around two adjacent spindles of the belting, in combination with a hollowed block, $p$, surrounding said plate, and perforated side face-plates affixed to said block $p$, substantially as set forth.

2. In link belting composed of interlapping rows of links connected by spindles passing alternately through the links of interlapping rows, the combination, with comparatively weak links, of strengthened links, substantially as described, one or more, an equal number in each row, each strengthened link being in contact with the respective strengthened link in the next row, and aligned with the respective strengthened link in the row next but one, so as to form one or more systems of strengthened links extending along the belt.

In testimony whereof we have signed this specification in the presence of two subscribing witnesses.

ERNST BOCKMÜHL.
WILHELM KARTHAUS.

Witnesses:
N. STAPPERS,
HEINR. DRESCHER.